(12) United States Patent
Husain

(10) Patent No.: US 6,695,255 B1
(45) Date of Patent: Feb. 24, 2004

(54) EMERGENCY AIRCRAFT LANDING SYSTEM

(76) Inventor: Mohamed T. Husain, 2940 Gulfstream Way, Mississauga ONT L5N 6J9 (CA)

( * ) Notice: Subject to any disclaimer, the term of this patent is extended or adjusted under 35 U.S.C. 154(b) by 0 days.

(21) Appl. No.: 10/384,418

(22) Filed: Mar. 7, 2003

(51) Int. Cl.[7] .............................................. B64C 25/68
(52) U.S. Cl. .................................. 244/110; 244/110 F
(58) Field of Search ..................... 244/110 E, 110 R, 244/110 F, 114 R

(56) References Cited

U.S. PATENT DOCUMENTS

| | | | |
|---|---|---|---|
| 3,128,066 A | 4/1964 | Bailey | 244/114 |
| 3,567,159 A | 3/1971 | Klein | 244/114 |
| 4,653,706 A | 3/1987 | Ragiab | 244/110 E |
| D296,940 S | 7/1988 | Dawson | D29/6 |
| 5,170,966 A | 12/1992 | Sheu | 244/110 E |
| 5,470,033 A | 11/1995 | Tsai et al. | 244/110 E |
| 6,092,763 A * | 7/2000 | Hemes | 244/114 R |
| 6,394,391 B1 * | 5/2002 | Lo | 244/110 E |

* cited by examiner

Primary Examiner—J. Woodrow Eldred

(57) ABSTRACT

An emergency aircraft landing system for absorbing the impact from an aircraft landing under emergency conditions includes a plurality of wheeled segments coupled into a line, a steerable head unit, a drive means, each segment having a base support plate and a plurality of hinged plates coupled in spaced relationship to the base support plate with an outer edge of each hinged plate being hingedly coupled to the base support plate by a vertical support such that an interior edge of each hinged plate is collapsible towards the base support plate, a plurality of shock absorbing units for cushioning collapsing of said interior edges of said hinged plates, and cushions coupled to each of the hinged plates.

13 Claims, 8 Drawing Sheets

EMERGENCY AIRCRAFT LANDING SYSTEM

BACKGROUND OF THE INVENTION

1. Field of the Invention

The present invention relates to aircraft landing systems and more particularly pertains to a new emergency aircraft landing system for absorbing the impact from an aircraft landing under emergency conditions such as a failure deploying the landing gear of the aircraft.

2. Description of the Prior Art

The use of aircraft landing systems is known in the prior art. U.S. Pat. No. 5,470,033 describes a method for controlling a carrier which is used to carry a flight vehicle. Another type of aircraft landing system is U.S. Pat. No. 4,653,706 disclosing a single trailer unit having a concave upper surface and air bags extending normally upwards in spaced relationship to each other along the device. U.S. Pat. No. 3,128,066 discloses a moving platform that is also a single unit. U.S. Pat. No. 5,170,966 discloses a landing system utilizing frictional bearing members. U.S. Pat. No. 3,567,159 discloses a landing device having a dual stage system in which the wings are supported by a first support assembly before the fuselage contacts a second support assembly. U.S. Des. Pat. No. 296,940 discloses an ornamental appearance for a trailer borne air inflated safety cushion.

While these devices fulfill their respective, particular objectives and requirements, the need remains for a system that is adjustable in length and provides multiple systems for absorbing impact from a landing aircraft, the multiple systems including a cushioned hinge plate system as described herein.

SUMMARY OF THE INVENTION

The present invention meets the needs presented above by providing multiple segments, each segment having multiple assemblies each designed for absorbing impact and cushioning an aircraft landing on the segments.

To this end, the present invention generally comprises a plurality of wheeled segments coupled into a line, a steerable head unit, a drive means, each segment having a base support plate and a plurality of hinged plates coupled in spaced relationship to the base support plate with an outer edge of each hinged plate being hingedly coupled to the base support plate by a vertical support such that an interior edge of each hinged plate is collapsible towards the base support plate, a plurality of shock absorbing units for cushioning collapsing of said interior edges of said hinged plates, and cushions coupled to each of the hinged plates.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
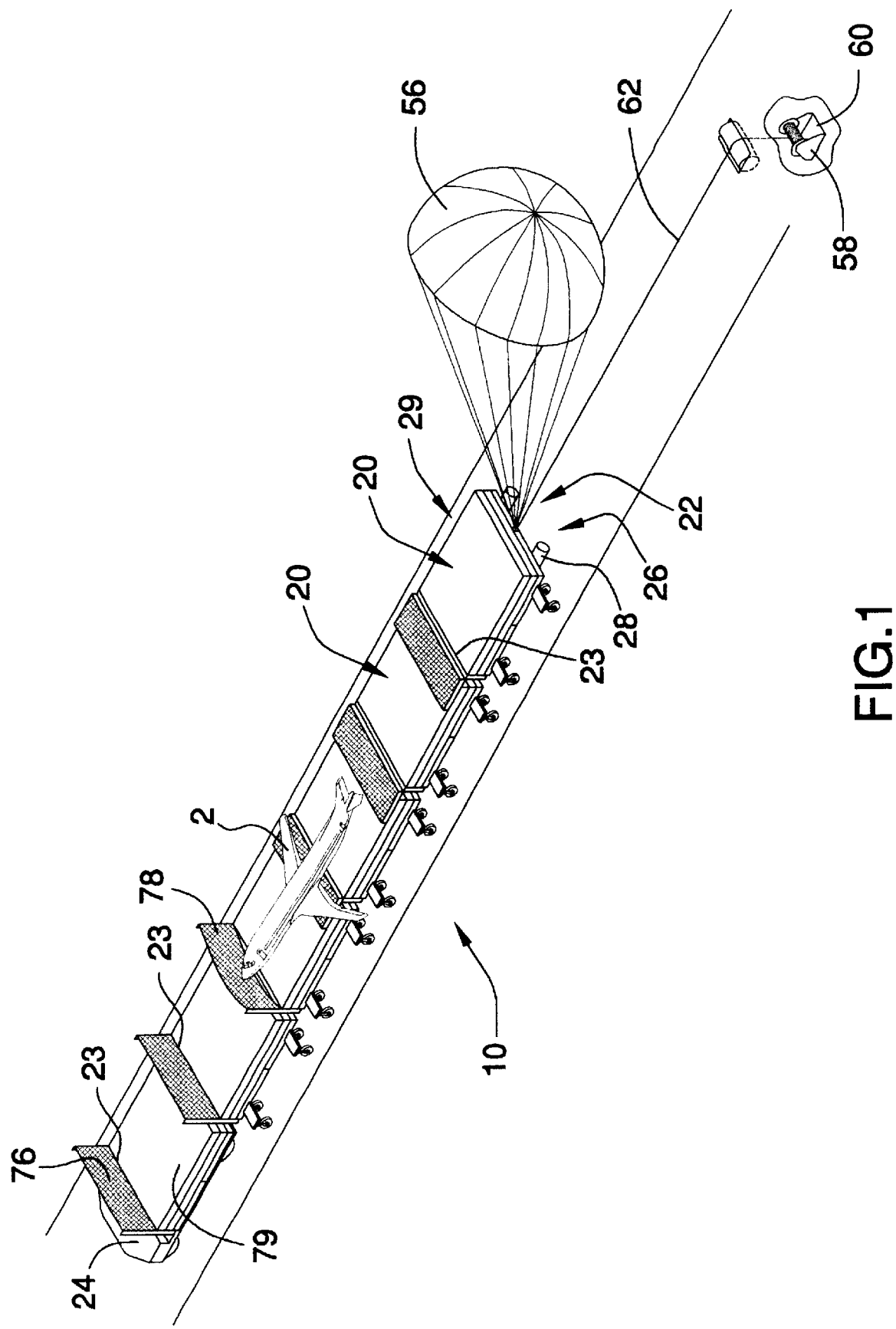
FIG. 1 is a perspective view of a new emergency aircraft landing system according to the present invention.
Figure 2:
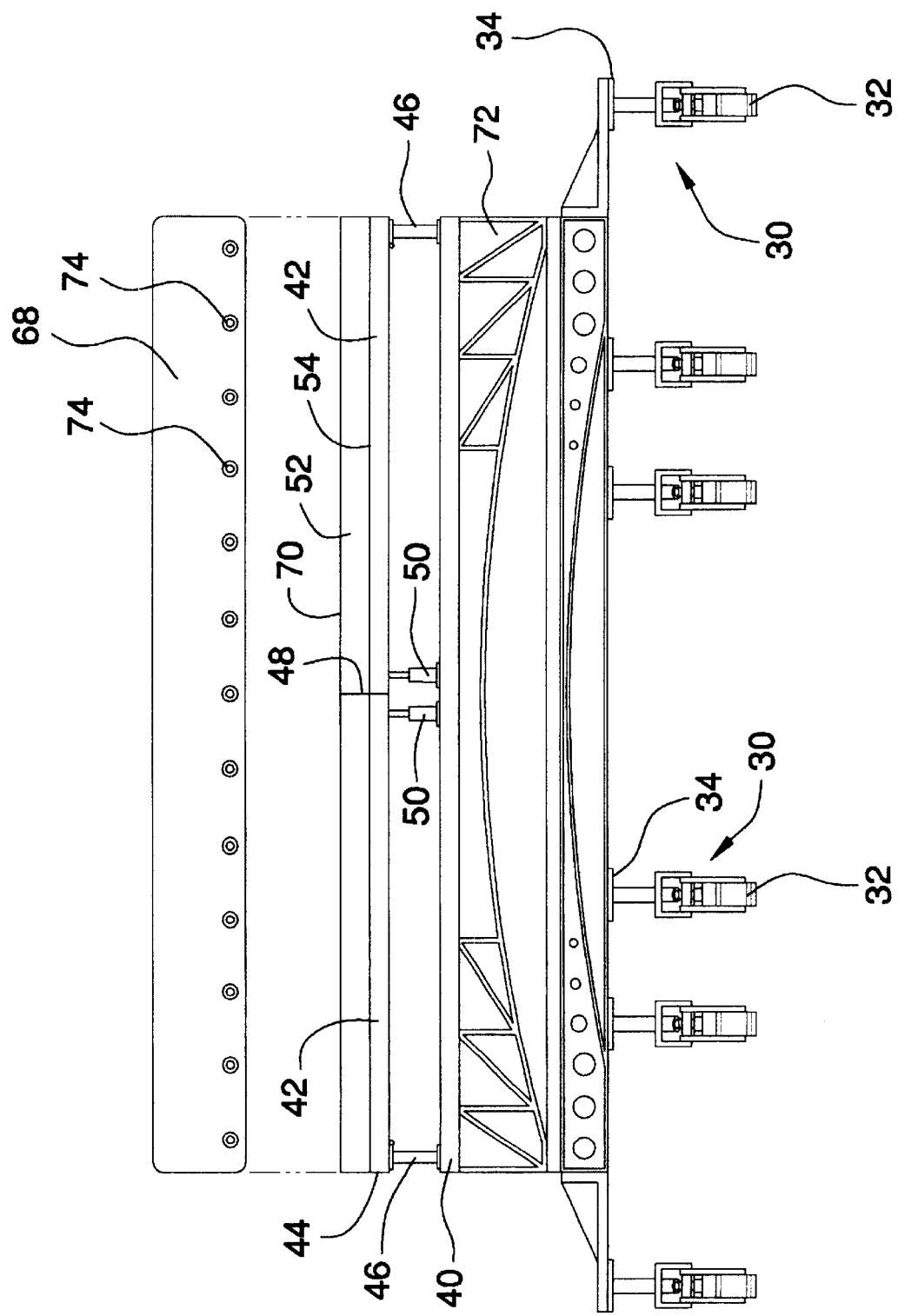
FIG. 2 is a front view of a segment of the present invention.
Figure 3:
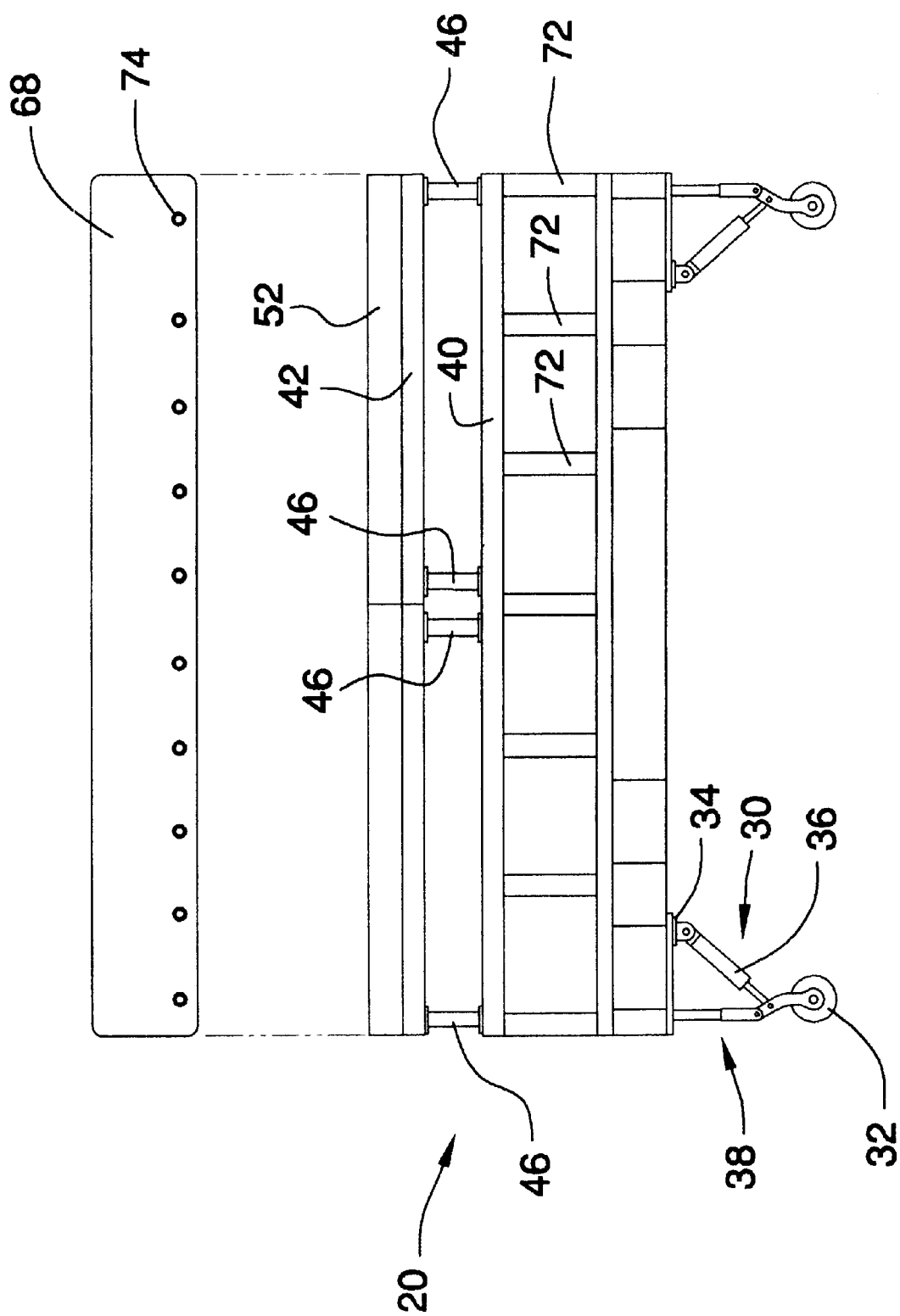
FIG. 3 is a side view of a segment of the present invention.
Figure 4:
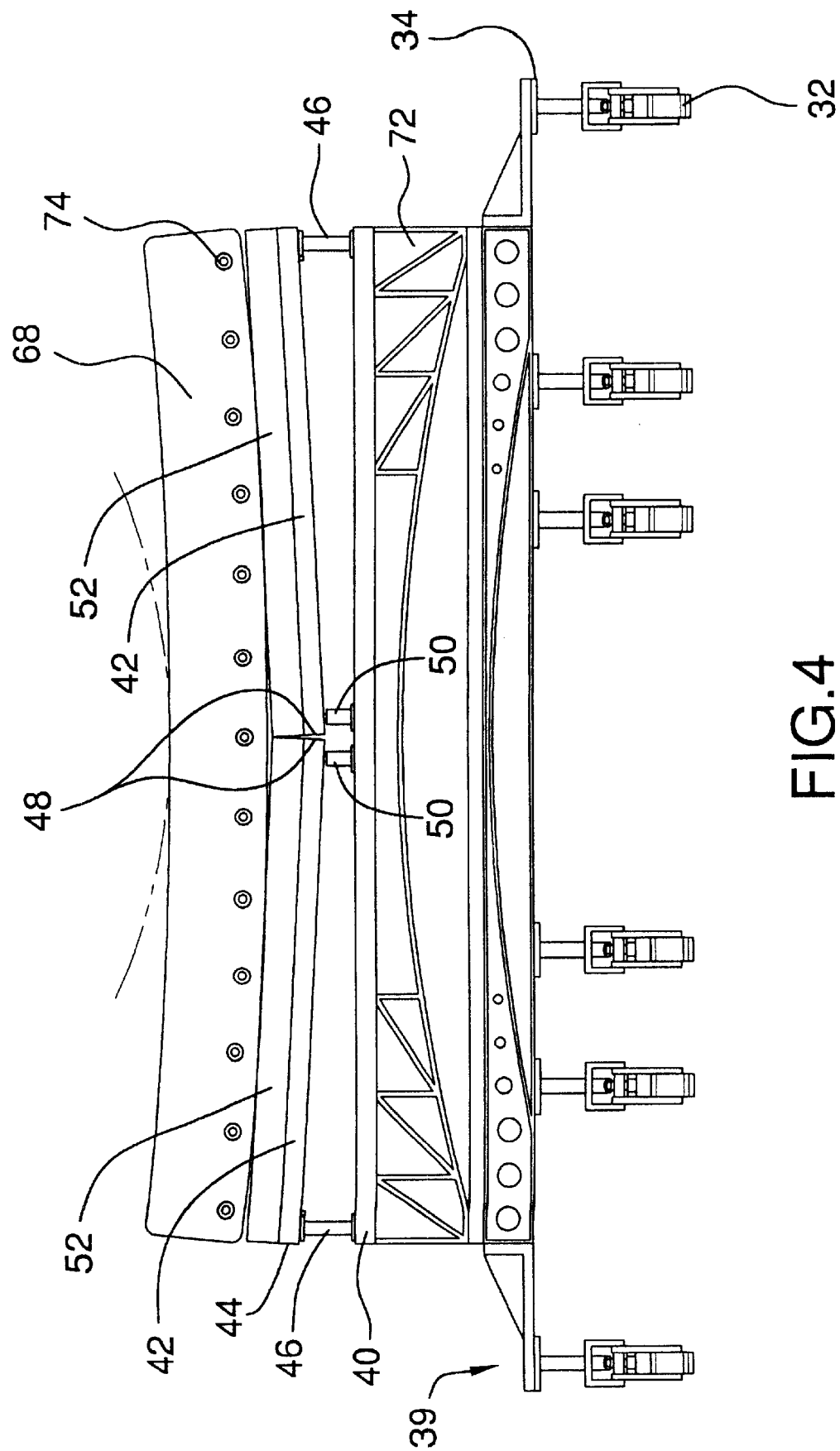
FIG. 4 is a front view of a segment of the present invention with the hinged plate system in a collapsed position.
Figure 5:
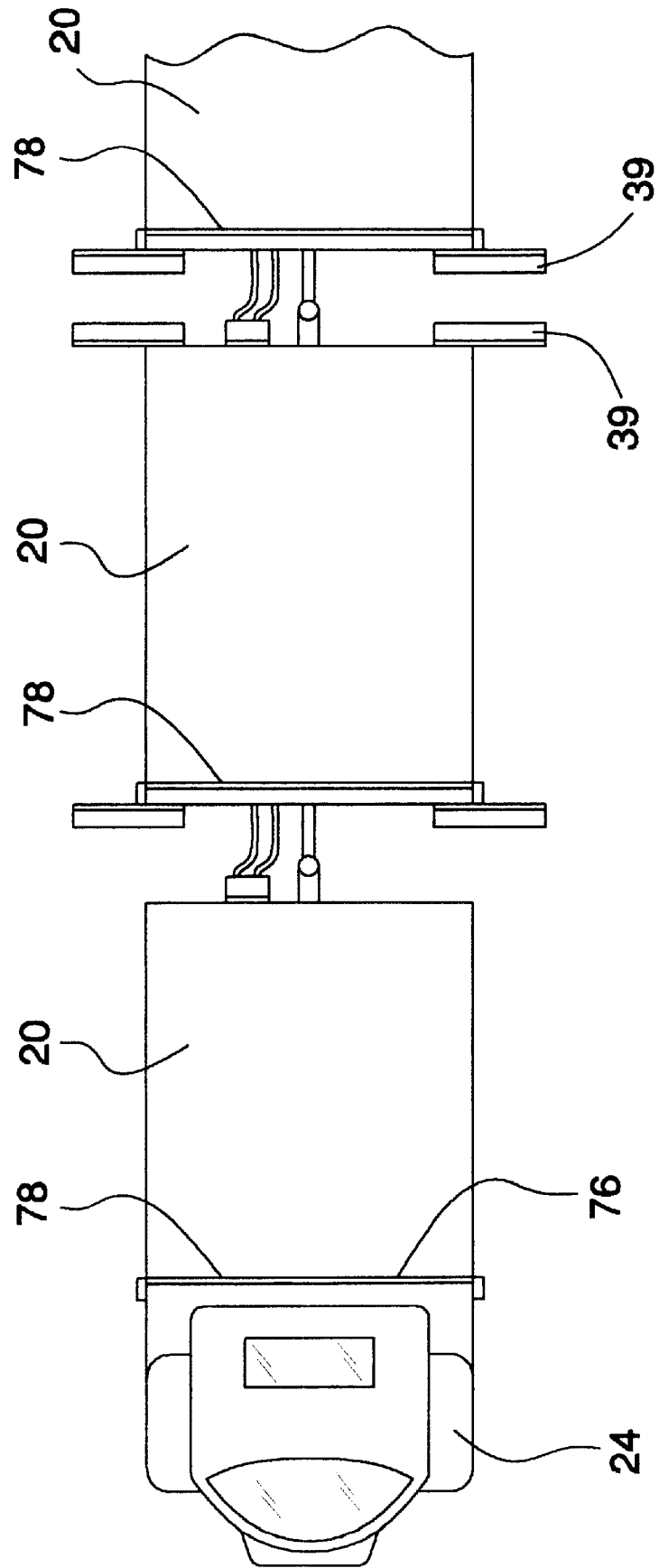
FIG. 5 is a top view of the front portion of the present invention.
Figure 6:
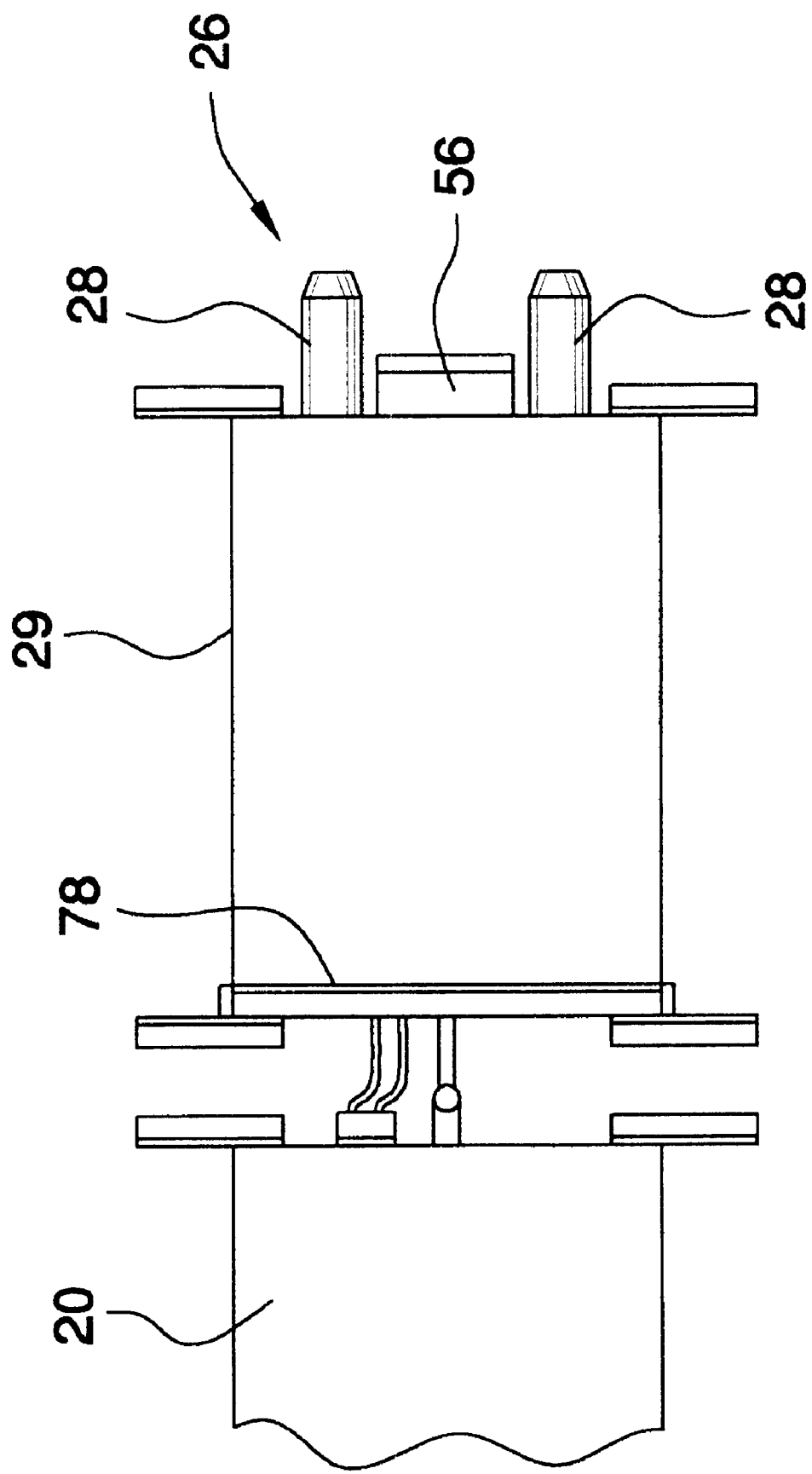
FIG. 6 is a top view of the rear portion of the present invention.
Figure 7:
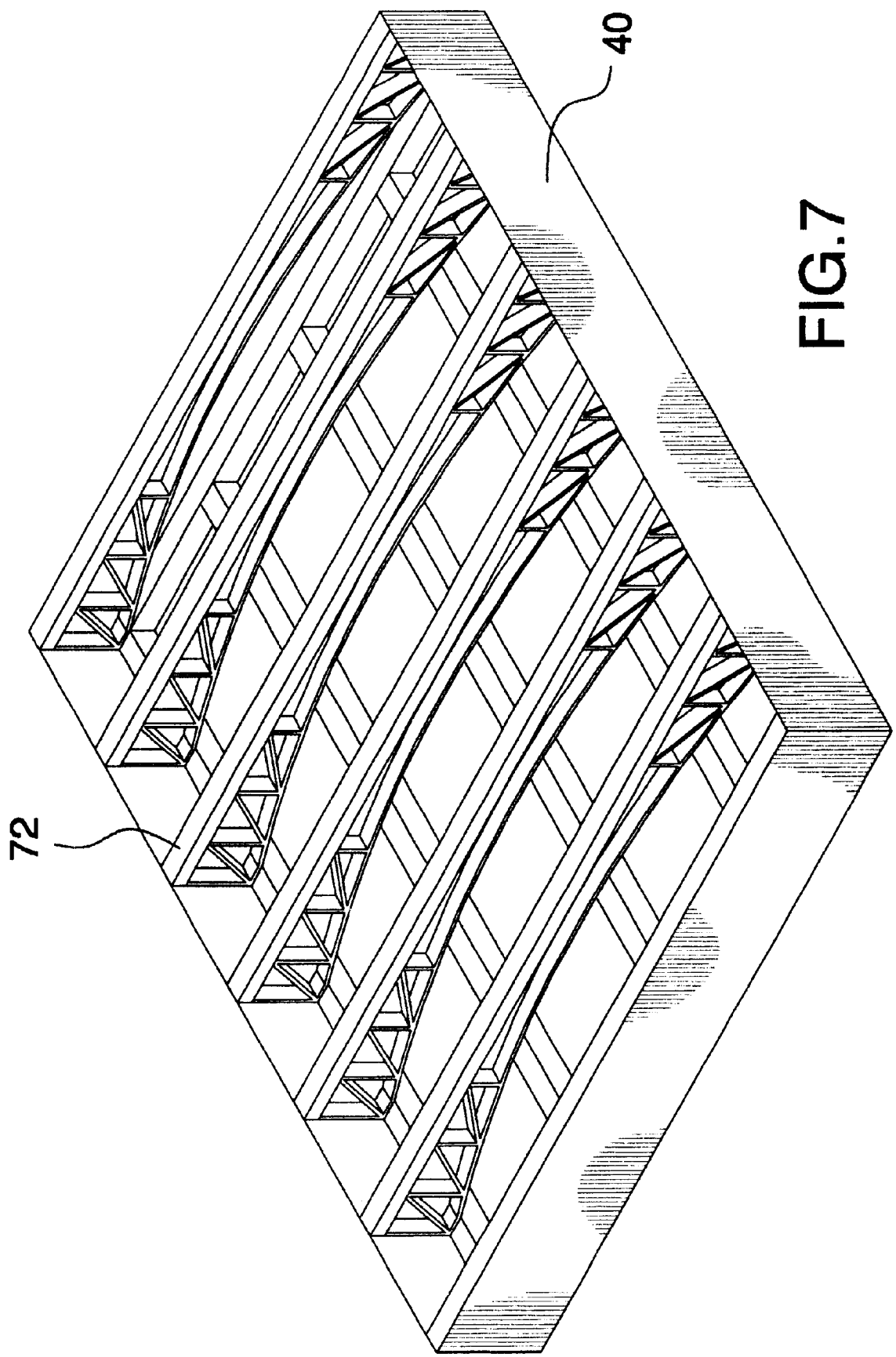
FIG. 7 is a partial cut-away perspective view of a lower portion of a segment of the present invention.
Figure 8:
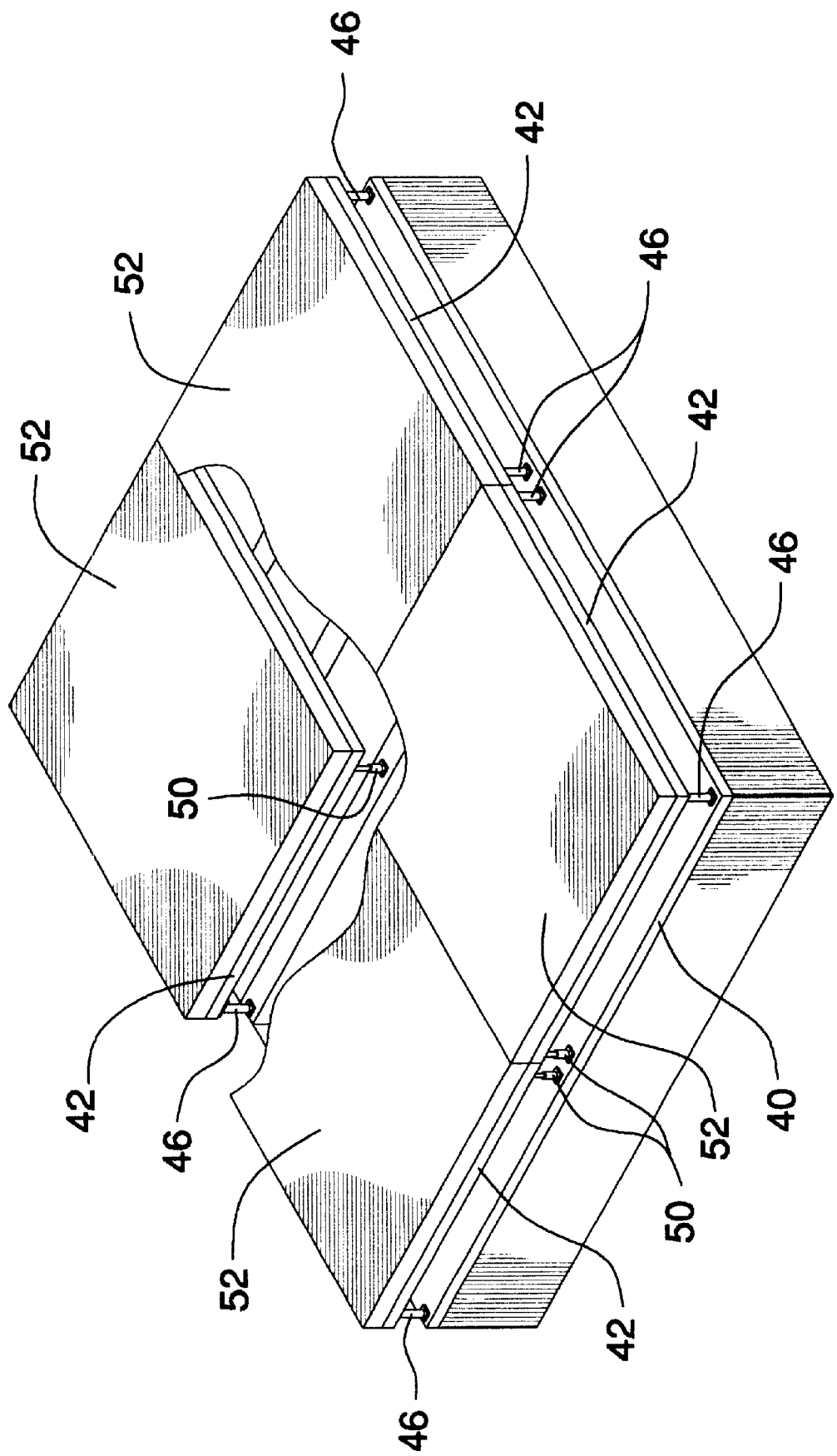
FIG. 8 is a partial cut-away perspective view of an upper portion of a segment of the present invention.

With reference now to the drawings, and in particular to FIGS. 1 through 8 thereof, a new emergency aircraft landing system embodying the principles and concepts of the present invention and generally designated by the reference numeral 10 will be described.

As best illustrated in FIGS. 1 through 8, the emergency aircraft landing system 10 generally comprises a plurality of wheeled segments 20 coupled into a line 22 of the wheeled segments 20. A steerable head unit 24 is coupled to a forwardmost one 25 of the segments 20. A drive means 26 is coupled to the segments 20 for providing a driving force to the segments 20. In an embodiment, the driving means is a pair of booster rockets 28 designed for moving the line 22 of segments 20 from a stationary position to a speed approximating the landing speed of the aircraft in a short distance.

Each segment 20 includes a wheel base assembly 30. The wheel assembly 30 includes a plurality of wheels 32. Each wheel 32 is pivotally coupled to a connection member 34. The wheel assembly 30 also includes a plurality of shock absorbers 36. Each shock absorber 36 is coupled between an associated one of the wheels 32 and the connection member 34. The connection member may be a commonly shared connection member for all the wheels of a particular segment but preferably is comprised of separate segments for facilitating replacement and maintenance of the wheel base assembly. The plurality of wheels 32 includes a group of base wheels 38 and a group of outboard wheels 39. The base wheels 38 are positioned directly below the segment 20 and the outboard wheels 39 are positioned offset from an edge 23 of the segment 20. The outboard wheels are foldable to facilitate storage of each segment.

Each segment 20 includes a base support plate 40 coupled to the wheel base assembly 30. A plurality of hinged plates 42 are coupled in spaced relationship to the base support plate 40. An outer edge 44 of each hinged plate 42 is hingedly coupled to the base support plate 40 by a vertical support 46 such that an interior edge 48 of each hinged plate 40 is collapsible towards the base support plate 40. The interior edge 48 is positioned in alignment with a longitudinal axis through the line 22 of segments 20. The interior edge 48 is coupled to and supported by a plurality of shock absorbing units 50 for cushioning collapsing of the interior edges 48 of the hinged plates 42 when the landing aircraft 2 impacts the line 22 of segments 20.

A plurality of cushions 52 are provided. Each cushion 52 is coupled to an upper surface 54 of an associated one of the hinged plates 42.

A parachute 56 is coupled to the rearmost one 29 of the segments 20 for facilitating slowing the line 22 of segments 20 after the aircraft 2 has landed on the line 22 of segments 20.

A winch 58 is coupled to a fixed position 60. The fixed position may be beneath an end of an existing runway. A line 62 is coupled to and extends from the winch 58. The line 62 includes a distal end 64 coupled to the rearmost one 29 of the segments 20. A winch control means 66 is operationally coupled to the winch 58 for adjustably providing resistance to forward movement of the line 22 of segments 20 to selectively slow the line 22 of segments 20 as desired when the landing aircraft 2 approaches the line 22 of segments 20.

A plurality of air bag assemblies 68 are provided. Each air bag assembly 68 is coupled to an upper surface 70 of the cushions 52 of an associated one of the segments 20 for absorbing and dissipating energy of the aircraft 2 landing on the air bag assembly 68. Each air bag assembly 68 includes a plurality of blow out valves 74 for releasing air in the air bag assembly 68 when the aircraft 2 impacts the air bag assembly.

For superior strength and support each segment 20 includes arched supports 72 coupled between the wheel base assembly 30 and the base support plate 40.

Netting 76 is coupled to a forward portion of the forwardmost one of the segments 20 such that the netting 76 extends upwardly from the forwardmost one of the segments 20 and is positioned between the head unit 24 and the forwardmost one of the segments 20. The netting 76 is one of a plurality of netting assemblies 78, each netting assembly 78 being coupled to an associated one of the segments 20 such that each netting assembly 78 extends upwardly from a forward edge of the associated segment 20.

It is preferred to have a sufficient number of segments 20 such that the line 22 of segments 20 is greater than three times a length of the landing aircraft 2.

In an embodiment, the head unit 24 includes a hinged plate assembly 79 for absorbing impact of the aircraft 2 when the aircraft lands on the head unit 24. The hinged plate assembly 79 has similar structure to the previously described hinge plates 42.

Except where the above described features are mutually exclusive, the present invention is intended to include the several embodiments that can readily be derived by combinations of the above described features consistent with the stated objects of the invention.

In use, the line of segments is preferably pre-assembled to the typical type of aircraft likely to make an emergency landing. Where possible, the line of segments may be adjusted where time permits before the aircraft must land. The line of segments is positioned on a runway strip, the winch line is attached, the air bag assemblies are inflated, and the drive means actuated to propel or urge the line of segments along the runway as the aircraft approaches. It is preferable to have the speed of the line of segments match the speed of the landing aircraft through adjustments to the resistance provided by the winch line. The aircraft is piloted to land on the line of segments where the impact force is dissipated through dispersal of the air in the air bag assemblies and shock absorption through the hinged plate system and wheel assemblies. A braking system is used to stop the line of segments after the aircraft has landed. The braking system may include the use of one or more parachutes deployed to slow the line of segments.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency aircraft landing system for absorbing and dissipating impact energy from a landing aircraft, said system comprising:

a plurality of wheeled segments coupled into a line of said wheeled segments;

a steerable head unit coupled to a forwardmost one of said segments;

a drive means coupled to said segments for providing a driving force to said segments;

each segment having a wheel base assembly;

each segment having a base support plate coupled to said wheel base assembly;

a plurality of hinged plates coupled in spaced relationship to said base support plate, an outer edge of each said hinged plate being hingedly coupled to said base support plate by a vertical support such that an interior edge of each said hinged plate is collapsible towards said base support plate;

said interior edge of each said hinged plate being positioned in alignment with a longitudinal axis through said line of segments, said interior edge being coupled to a plurality of shock absorbing units for cushioning collapsing of said interior edges of said hinged plates when the landing aircraft impacts said line of segments; and a plurality of cushions, each cushion being coupled to an upper surface of an associated one of said hinged plates.

2. The emergency aircraft landing system of claim 1, further comprising:

a parachute coupled to a rearmost one of said segments for facilitating slowing said line of segments after the aircraft has landed on said line of segments.

3. The emergency aircraft landing system of claim 1, further comprising:

a winch coupled to a fixed position;

a line coupled and extending from said winch, said line having a distal end coupled to a rearmost one of said segments; and a winch control means for adjustably providing resistance to forward movement of said line of segments to selectively slow said line of segments as desired when the landing aircraft approaches said line of segments.

4. The emergency aircraft landing system of claim 1, further comprising:

a plurality of air bag assemblies, each air bag assembly being coupled to an upper surface of said cushions of an associated one of said segments for absorbing and dissipating energy of the aircraft landing on said air bag assembly.

5. The emergency aircraft landing system of claim 1, further comprising:

each segment having arched supports coupled between said wheel base assembly and said base support plate.

6. The emergency aircraft landing system of claim 4, further comprising:

each air bag assembly having a plurality of blow out valves for releasing air in said air bag assembly when the aircraft impacts said air bag assembly.

7. The emergency aircraft landing system of claim 1 further comprising:

netting coupled to a forward portion of said forwardmost one of said segments such that said netting extends upwardly from said forwardmost one of said segments and is positioned between said head unit and said forwardmost one of said segments.

8. The emergency aircraft landing system of claim 1 wherein said line of segments is greater than three times a length of the landing aircraft.

9. The emergency aircraft landing system of claim 7, further comprising:

said netting being one of a plurality of netting assemblies, each netting assembly being coupled to an associated one of said segments such that each netting assembly extends upwardly from a forward edge of said associated segment.

10. The emergency aircraft landing system of claim 1 wherein said head unit includes a hinged plate assembly for absorbing impact of the aircraft when the aircraft lands on said head unit.

11. The emergency aircraft landing system of claim 1 wherein said wheel assembly further comprises:

a plurality of wheels, each wheel being pivotally coupled to a connection member; and a plurality of shock absorbers, each shock absorber being coupled between an associated one of said wheels and said connection member.

12. The emergency aircraft landing system of claim 11, further comprising:

said plurality of wheels including a group of base wheels and a group of outboard wheels, said base wheels being positioned directly below said segment, said outboard wheels being positioned offset from an edge of said segment.

13. An emergency aircraft landing system for absorbing and dissipating impact energy from a landing aircraft, said system comprising:

a plurality of wheeled segments coupled into a line of said wheeled segments;

a steerable head unit coupled to a forwardmost one of said segments;

a drive means coupled to said segments for providing a driving force to said segments;

each segment having a wheel base assembly;

each segment having a base support plate coupled to said wheel base assembly;

a plurality of hinged plates coupled in spaced relationship to said base support plate, an outer edge of each said hinged plate being hingedly coupled to said base support plate by a vertical support such that an interior edge of each said hinged plate is collapsible towards said base support plate;

said interior edge of each said hinged plate being positioned in alignment with a longitudinal axis through said line of segments, said interior edge being coupled to a plurality of shock absorbing units for cushioning collapsing of said interior edges of said hinged plates when the landing aircraft impacts said line of segments;

a plurality of cushions, each cushion being coupled to an upper surface of an associated one of said hinged plates;

a parachute coupled to a rearmost one of said segments for facilitating slowing said line of segments after the aircraft has landed on said line of segments;

a winch coupled to a fixed position;

a line coupled and extending from said winch, said line having a distal end coupled to said rearmost one of said segments;

a winch control means for adjustably providing resistance to forward movement of said line of segments to selectively slow said line of segments as desired when the landing aircraft approaches said line of segments;

a plurality of air bag assemblies, each air bag assembly being coupled to an upper surface of said cushions of an associated one of said segments for absorbing and dissipating energy of the aircraft landing on said air bag assembly;

each segment having arched supports coupled between said wheel base assembly and said base support plate;

each air bag assembly having a plurality of blow out valves for releasing air in said air bag assembly when the aircraft impacts said air bag assembly;

netting coupled to a forward portion of said forwardmost one of said segments such that said netting extends upwardly from said forwardmost one of said segments and is positioned between said head unit and said forwardmost one of said segments;

wherein said line of segments is greater than three times a length of the landing aircraft;

said netting being one of a plurality of netting assemblies, each netting assembly being coupled to an associated one of said segments such that each netting assembly extends upwardly from a forward edge of said associated segment;

wherein said head unit includes a hinged plate assembly for absorbing impact of the aircraft when the aircraft lands on said head unit;

wherein said wheel assembly includes a plurality of wheels, each wheel being pivotally coupled to a connection member;

wherein said wheel assembly includes a plurality of shock absorbers, each shock absorber being coupled between an associated one of said wheels and said connection member; and said plurality of wheels including a group of base wheels and a group of outboard wheels, said base wheels being positioned directly below said segment, said outboard wheels being positioned offset from an edge of said segment.

* * * * *